(12) United States Patent
Saunders et al.

(10) Patent No.: US 9,012,554 B2
(45) Date of Patent: Apr. 21, 2015

(54) USE OF SURFACE MODIFIED CALCIUM CARBONATE IN ADHESIVES, SEALANTS AND/OR CAULKS

(75) Inventors: George Saunders, Brandon, VT (US); Joseph McJunkins, Middleburg Heights, OH (US); Matthias Buri, Rothrist (CH); Patrick A. C. Gane, Rothrist (CH)

(73) Assignee: Omya International AG, Oftringen (CH)

( * ) Notice: Subject to any disclaimer, the term of this patent is extended or adjusted under 35 U.S.C. 154(b) by 318 days.

(21) Appl. No.: 13/638,018

(22) PCT Filed: Apr. 5, 2011

(86) PCT No.: PCT/EP2011/055250
§ 371 (c)(1),
(2), (4) Date: Dec. 3, 2012

(87) PCT Pub. No.: WO2011/124564
PCT Pub. Date: Oct. 13, 2011

(65) Prior Publication Data
US 2013/0143995 A1    Jun. 6, 2013

Related U.S. Application Data

(60) Provisional application No. 61/342,217, filed on Apr. 9, 2010.

(51) Int. Cl.
*C01C 1/02* (2006.01)
*C09J 11/04* (2006.01)
*C09C 1/02* (2006.01)

(52) U.S. Cl.
CPC ............... *C09J 11/04* (2013.01); *C09C 1/022* (2013.01); *C01P 2004/61* (2013.01); *C01P 2004/62* (2013.01); *C01P 2006/12* (2013.01)

(58) Field of Classification Search
CPC ...... C09J 11/04; C09C 1/022; C01P 2004/61; C01P 2006/12
USPC ........................................................ 524/443
See application file for complete search history.

(56) References Cited

U.S. PATENT DOCUMENTS

| 6,666,953 | B1 * | 12/2003 | Gane et al. ................. 162/181.2 |
| 2006/0162884 | A1 * | 7/2006 | Gane et al. .................... 162/158 |

FOREIGN PATENT DOCUMENTS

| WO | 2004083316 A1 | 9/2004 |
| WO | 2009074492 A1 | 6/2009 |

* cited by examiner

*Primary Examiner* — Kelechi Egwim
(74) *Attorney, Agent, or Firm* — Amster, Rothstein & Ebenstein LLP

(57) ABSTRACT

The present invention relates to the use of surface modified calcium carbonate as a filler in adhesives, sealants, and/or caulks, wherein the surface modified calcium carbonate is a mineral pigment product formed in situ by the double and/or multiple reaction between a calcium carbonate and the reaction product or products of the said carbonate with gaseous $CO_2$ formed in situ and/or coming from an external supply, and the reaction product or products of the said carbonate with one or more moderately strong to strong $H_3O^+$ ion donors, and at least one aluminum silicate and/or at least one synthetic silica and/or at least one calcium silicate and/or at least one silicate of a monovalent salt and/or at least one aluminum hydroxide and/or at least one sodium and/or potassium aluminate. It further relates to method of producing adhesives, sealants, and/or caulks comprising surface modified calcium carbonate, as well as to the adhesives, sealants, and/or caulks obtained by this process.

22 Claims, No Drawings

USE OF SURFACE MODIFIED CALCIUM CARBONATE IN ADHESIVES, SEALANTS AND/OR CAULKS

CROSS-REFERENCE TO RELATED APPLICATIONS

This application is a U.S. national phase of PCT Application No. PCT/EP2011/055250, filed Apr. 5, 2011, which claims priority to U.S. Provisional Application No. 61/342, 217, filed Apr. 9, 2010.

The present invention relates to the use of surface modified calcium carbonate (SMCC) in adhesives, sealants, and/or caulks, a method for the production of such adhesives, sealants, and/or caulks, as well as adhesives, sealants, and/or caulks comprising these SMCCs.

The use of reinforcing additives and fillers, such as, fumed silica is well known within the adhesive, sealant, and caulk industry. These reinforcing fillers are incorporated to control rheology, and influence physical properties of the various formulations.

These reinforcing fillers are difficult to handle, being easily added to the atmosphere by simply opening the package, and can be potentially dangerous to those exposed if inhaled.

Typically, formulations produced with reinforcing fillers, like fumed silica, require special handling in order to promote worker safety, and extended mixing times to fully disperse the reinforcing filler into the batch.

Consequently, it is an object of the present invention to provide adhesive, sealant, and/or caulk products, having improved worker safety, and excellent rheological, and physical performance properties.

It has been surprisingly found that the inclusion of surface modified calcium carbonates in adhesive, sealant and/or caulk products provides improved worker safety, and excellent rheological, and physical performance properties to adhesive, sealant and/or caulk products.

Thus, one aspect of the present invention is the use of SMCC as reinforcing filler.

Particularly, the present invention relates to the use of SMCC as reinforcing filler in adhesives, sealants, and/or caulk.

In this respect, adhesives are generally defined as compounds bonding two items together. According to DIN EN 923, an adhesive is a "non-metallic" material, bonding parts by surface adhesion and cohesion, which is mostly based on molecular attraction forces.

Sealants and caulks are particularly defined as a material for sealing joints, wherein the sealing material must stick to the joint flanks, in order to be able to fulfil its function. The finished sealing material must provide adhesion to the materials to be sealed, as well as cohesion preventing penetration of different media such as gas and/or liquids. Sealant materials usually have a characteristic slump resistance.

As used with respect to the present invention the term "reinforcing filler" means a pigment or filler that is added to the formulation to impart rheology (slump resistance), improve tensile strength, or influence elongation properties.

Especially useful surface modified calcium carbonates (SMCC) in the context of the present invention are known and described, e.g. in WO 2009/074492, and unpublished European patent application number 09162738.0. It is, however preferred to use such surface modified calcium carbonates as disclosed in International patent application WO 2004/083316.

Thus, the SMCCs are mineral pigment products formed in situ by the double and/or multiple reaction between a calcium carbonate and the reaction product or products of the said carbonate with gaseous $CO_2$ formed in situ and/or coming from an external supply, and the reaction product or products of the said carbonate with one or more moderately strong to strong $H_3O^+$ ion donors, and at least one aluminium silicate and/or at least one synthetic silica and/or at least one calcium silicate and/or at least one silicate of a monovalent salt such as sodium silicate and/or potassium silicate and/or lithium silicate, and/or at least one aluminium hydroxide and/or at least one sodium and/or potassium aluminate, wherein sodium silicate is especially preferred.

In this respect, the calcium carbonate preferably is selected from the group comprising natural ground calcium carbonate and/or a mixture of natural ground calcium carbonate with talc, kaolin, titanium dioxide, magnesium oxide or with any mineral which is inert vis-à-vis moderately strong to strong $H_3O^+$ ion donors. Furthermore, it is also possible to use precipitated calcium carbonate (PCC).

It is especially preferred that the natural calcium carbonate is selected from the group comprising marble, calcite, chalk, dolomite or mixtures thereof.

Strong $H_3O^+$ ion donors useful in the invention are selected from the group comprising strong acids or mixtures thereof generating $H_3O^+$ ions, and are preferably acids having a $pK_a$ of less than or equal to zero at 22° C. and more particularly are sulphuric acid, hydrochloric acid or mixtures thereof.

Moderately strong $H_3O^+$ ion donors useful in the invention are preferably selected from the group comprising acids having a $pK_a$ of from 0 to 2.5 at 22° C. and are more preferably selected from the group comprising $H_2SO_3$, $HSO_4^-$, $H_3PO_4$, oxalic acid or mixtures thereof, and even more preferably from the group comprising acids forming bivalent cation salts, such as calcium salts, which are almost insoluble in water, that is to say with a solubility of less than 0.01% by weight.

Regarding the silicate, it is furthermore preferred that the mineral pigment product contains less than 0.1% by weight silicate of a monovalent salt such as sodium, potassium or lithium silicate or mixtures thereof, preferably such as sodium silicate, relative to the dry weight of calcium carbonate.

The SMCC useful to the invention preferably has a BET specific surface area of between 25 m²/g and 200 m²/g measured according to ISO 9277, more preferably between 30 m²/g and 80 m²/g and most preferably between 35 m²/g and 60 m²/g.

Furthermore, the SMCCs useful in the invention preferably have a volume median particle diameter $d_{50}$ of from 0.1 to 50 μm, more preferably 0.5 to 40 μm, even more preferably of from 1 to 10 μm, especially of from 1.5 to 5 μm, most preferably of from 2 to 3 μm, e.g. 2.7 μm.

In a preferred embodiment, the SMCCs useful in the invention have a $d_{98}$ value of from 1 to 20 μm, more preferably of from 2 to 15 μm, especially of from 4 to 10 μm, most preferably of from 5 to 8 μm, e.g. 6.9 μm.

For the determination of the $d_{50}$ and $d_{98}$ values, a Malvern Mastersizer 2000 from the company Malvern, UK was used. The measurement was performed in an aqueous solution of 0.1 wt % $Na_4P_2O_7$. The samples were dispersed using a high-speed stirrer and ultrasound.

In this respect, the $d_{50}$ and $d_{98}$ values define the diameters, at which 50 vol.-% or 98 vol.-% of the particles measured, have a diameter smaller than the $d_{50}$ or $d_{98}$ value, respectively.

Generally, it is preferred that the SMCC has a narrow particle size distribution $d_{98}/d_{50}$, preferably smaller than 4, more preferably smaller than 3, e.g. 2.6.

The bulk density (loose) determined by means of a Hosokawa Powder Characterizer of the SMCC useful in the invention determined by means of a Hosokawa Powder Characterizer is from 0.05 to 1 g/cm³, more preferably from 0.1 to 0.5 g/cm³, most preferably from 0.2 to 0.3 g/cm³, e.g. 0.27 g/cm³.

The SMCC useful in the present invention may be prepared according to several methods of production, e.g. such described in WO 2009/074492, and unpublished European patent application number 09162738.0. It is, however preferred to produce it according to the method described in International patent application WO 2004/083316 mentioned above.

Thus, it is preferably produced by a method comprising the following steps:
a) the treatment of the calcium carbonate in aqueous phase with the moderately strong to strong $H_3O^+$ ion donor or donors and the treatment with the gaseous $CO_2$ formed in situ and/or coming from an external supply, which treatment is an integral part of step a),
b) the addition, prior to and/or simultaneous with step a), of at least one aluminium silicate and/or at least one synthetic silica and/or at least one calcium silicate and/or at least one silicate of a monovalent salt such as sodium silicate and/or potassium silicate and/or lithium silicate, preferably such as sodium silicate, and/or sodium aluminate and/or potassium aluminate.

Furthermore, the following optional steps may independently from each other be included in the production method:
c) the addition of a base, preferably a bivalent ion base, more preferably lime and/or calcium carbonate in dry form or in aqueous suspension, optionally containing one or more anionic, cationic and/or weakly anionic dispersing agents,
d) putting in anionic aqueous suspension the product obtained in step b) or c) at a concentration of dry matter of between 1 wt % and 80 wt %, optionally using at least one anionic electrolyte,
e) putting the product obtained in step b) or c) in cationic aqueous suspension by the addition of at least one cationic electrolyte,
f) putting the product obtained in step b) or c) in weakly anionic aqueous suspension by the addition of at least one weakly anionic electrolyte,
g) drying after one of steps b) to f).

According to a special embodiment, the strong acid or acids can be mixed with the moderately strong acid or acids as defined above.

The molar quantity of moderately strong to strong $H_3O^+$ ion donors relative to the number of moles of $CaCO_3$ preferably is in total between 0.05 and 1, more preferably between 0.1 and 0.5.

It may furthermore be advantageous that step a) and/or step b) are repeated several times.

According to a preferred embodiment, the temperature during step a) of the treatment is between 5° C. and 100° C., and preferably between 65° C. and 90° C.

It also preferred that the duration of steps a) to c) of the treatment is from 0.01 hours to 24 hours and more preferably from 0.2 hours to 6 hours.

According to yet another preferred embodiment, the pH of the resulting product is greater than 7.5, between one hour and twenty-four hours and more preferably between one hour and five hours after the end of the treatment.

In a further preferred embodiment, the content of monovalent silicate salt such as sodium, potassium or lithium silicate or mixtures thereof is less than 0.1% by weight relative to the dry weight of calcium carbonate.

The treatment method according to the invention is implemented in aqueous phase at moderate to low concentrations of dry matter, wherein the respective slurries may have various concentrations. Preferably, the dry matter content is between 0.3% and 80% by weight, more preferably between 15% and 60%.

Preferably, the components of step b) are added in an amount of from 0.1% to 25%, more preferably of from 2 to 15%, most preferably of from 3% to 10%, e.g. 4% by dry weight relative to the dry weight of calcium carbonate.

According to step d) the product obtained in step b) or c) may be put in an anionic aqueous suspension at a concentration of dry matter of between 1 wt % and 80 wt %, optionally using at least one anionic electrolyte.

This anionic electrolyte may be used in an amount of from 0.05% to 5.0% by dry weight selected from the group comprising homopolymers or copolymers in the non-neutralised, partially neutralised or completely neutralised acidic state, of monomers with ethylenic unsaturation and a monocarboxylic function such as acrylic or methacrylic acid or the hemiesters of diacids such as $C_1$ to $C_4$ monoesters of maleic or itaconic acids, or mixtures thereof, or with a dicarboxylic function chosen from amongst the ethylenically unsaturated monomers with a dicarboxylic function such as crotonic, isocrotonic, cinnamic, itaconic or maleic acid, or anhydrides of carboxylic acids such as maleic anhydride or with a sulphonic function chosen from amongst ethylenically unsaturated monomers with a sulphonic function such as acrylamido-methyl-propane-sulphonic acid, sodium methallylsulphonate, vinyl sulphonic acid and styrene sulphonic acid or with a phosphoric function chosen from amongst ethylenically unsaturated monomers with a phosphoric function such as vinyl phosphoric acid, ethylene glycol methacrylate phosphate, propylene glycol methyacrylate phosphate, ethylene glycol acrylate phosphate, propylene glycol acrylate phosphate and ethoxylates thereof or with a phosphonic function chosen from amongst ethylenically unsaturated monomers with a phosphonic function such as vinyl phosphonic acid or mixtures thereof or polyphosphates.

The cationic electrolyte, which may be used in step e), preferably is present in an amount of from 0.05% to 5.0% by dry weight and is preferably selected from the group comprising homopolymers or copolymers of ethylenically unsaturated cationic monomers or quaternary ammonium such as [2-(methacryloyloxy) ethyl]trimethyl ammonium sulphate or chloride, [2-(acryloyloxy) ethyl]trimethyl ammonium chloride or sulphate, [3-(acrylamido) propyl]trimethyl ammonium chloride or sulphate, dimethyl diallyl ammonium chloride or sulphate, or [3-(methacrylamido) propyl]trimethyl ammonium chloride or sulphate.

In step f), a weakly anionic electrolyte may be used, preferably in an amount of from 0.05% to 5.0% by dry weight, and is preferably selected from the group comprising weakly ionic and water-soluble copolymers composed of:
a) at least one anionic monomer with a carboxylic or dicarboxylic or phosphoric or phosphonic or sulphonic function or a mixture thereof,
b) at least one non-ionic monomer, the non-ionic monomer consisting of at least one monomer of formula (I):

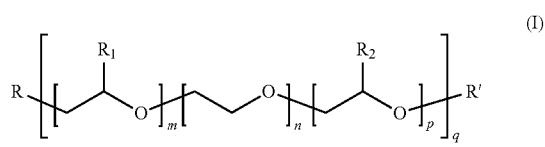

in which:
- m and p represent a number of alkylene oxide units less than or equal to 150,
- n represents a number of ethylene oxide units less than or equal to 150,
- q represents an integer number at least equal to 1 and such that $5 \leq (m+n+p)q \leq 150$, and preferentially such that $15 \leq (m+n+p)q \leq 120$,
- $R_1$ represents hydrogen or the methyl or ethyl radical,
- $R_2$ represents hydrogen or the methyl or ethyl radical,
- R represents a radical containing a polymerisable unsaturated function, preferentially belonging to the vinyl group and to the group of acrylic, methacrylic, maleic, itaconic, crotonic or vinylphthalic esters as well as to the group of urethane unsaturates such as for example acrylurethane, methacrylurethane, α-α' dimethyl-isopropenyl-benzylurethane, or allylurethane, and to the group of allyl or vinyl ethers, whether or not substituted, or to the group of ethylenically unsaturated amides or imides,
- R' represents hydrogen or a hydrocarbon radical having 1 to 40 carbon atoms, and preferentially represents a hydrocarbon radical having 1 to 12 carbon atoms and highly preferentially a hydrocarbon radical having 1 to 4 carbon atoms, or a mixture of several monomers of formula (I).

Furthermore, the weakly ionic and water-soluble copolymers may comprise:

c) at least one monomer of the acrylamide or methacrylamide type or derivatives thereof such as N-[3-(dimethylamino) propyl]acrylamide or N-[3-(dimethylamino) propyl]methacrylamide, and mixtures thereof, or at least one non-water soluble monomer such as alkyl acrylates or methacrylates, unsaturated esters such as N-[2-(dimethylamino) ethyl] methacrylate, or N-[2-(dimethylamino) ethyl]acrylate, vinyls such as vinyl acetate, vinylpyrrolidone, styrene, alphamethylstyrene and derivatives thereof, or at least one cationic monomer or quaternary ammonium such as [2-(methacryloyloxy) ethyl]trimethyl ammonium chloride or sulphate, [2-(acryloyloxy) ethyl]trimethyl ammonium chloride or sulphate, [3-(acrylamido) propyl]trimethyl ammonium chloride or sulphate, dimethyl diallyl ammonium chloride or sulphate, [3-(methacrylamido) propyl] trimethyl ammonium chloride or sulphate, or at least one organofluorinated or organosililated monomer, or a mixture of several of these monomers, d) at least one monomer possessing at least two ethylenic unsaturations referred to in the remainder of the application as a cross-linking monomer.

Thus, the SMCC useful in the present invention may be used in the dry form or in the form of an aqueous suspension, wherein it preferably has a pH greater than 7.5 measured at 20° C., and depending on the method of production, it may further comprise a cationic, an anionic, and a weakly anionic electrolyte, as defined above.

According to the present invention the above described SMCC may be advantageously used in common adhesives, sealants, and/or caulks.

Adhesives, sealants, and/or caulks, which are useful in the present invention are any well-known in this technical field, especially such based on acrylic, polyurethane, polysulfide, silyl-terminated polyether or polyurethane, silicone, or silicone modified resins or binders.

In addition, these adhesives, sealants, and/or caulks may comprise conventional additives such as solvents, rubber, adhesion promoters, pigments and/or fillers such as titanium dioxide. The corresponding formulations may be either waterborne, or based on other solvents.

Typical adhesive, sealant and/or caulk formulations may comprise from 5 to 35 wt. % binder, from 20 to 70 wt. % filler, from 5 to 35 wt. % water or other solvents, from 0 to 10 wt % pigment, and from 0-5% additives, based on the total weight of the formulation respectively.

It is, however, also possible that the adhesive, sealant and/or caulk formulations do not contain any solvent. In this case, it will be more preferable that the formulation comprises from 10 to 30 wt. % binder, from 40 to 70 wt. % filler, from 10 to 30 wt. % plasticizers, from 0 to 10 wt % pigment, and from 0-5% additives, based on the total weight of the formulation respectively.

Binders, which can be used in the adhesive, sealant and/or caulk formulations may be any conventional binders known in this technical field. Adhesives may differ from sealants in the particular binder employed. For example, sealants tend to implement relatively long, flexible polymer chains that are not cross-linked, whereas the polymers of adhesives tend to be less flexible and more cross-linked. For the use in water-based formulations emulsion binders, such as acrylic binders are especially preferred. In solvent-based systems cycloaliphatic hydrocarbon resins are especially useful, whereas it is preferred to use 1 or 2-component binder systems in solvent-free formulations, wherein the 1 component systems are cured upon contact with sufficient humidity in the air, and the 2 component systems are cured upon contacting the components. Typical examples for such systems are 2 component polysulfides, 1 or 2 component polyurethanes, 1 component silane terminated polyurethanes, 1 or 2 component silane-modified silicon, 1 or 2 component silicon, epoxy binders, etc.

Fillers, which are usually applied are e.g. carbonates or talc, all or part of which may be functional fillers, i.e. act as rheology modifier. Functional fillers usually employed are e.g. PCC, fumed silica, sheet silicates or polyamide waxes.

As mentioned above, the formulations may be based on water or other solvents such as aliphatic or alcohol-based solvents. They should be liquid and have appropriate vapour pressure so that they finally evaporate under the operating conditions, as, usually, water or solvent based formulations are cured by the evaporation of the water or solvent. It is, however, also possible that the initial formulation do not contain any solvent.

Any usually employed pigments may be used in the adhesive sealant and/or caulk formulations, such as, e.g. titanium dioxide or carbon black.

Furthermore, also commonly known additives such as biocides, UV stabilisers, or adhesion promoters may be used.

According to the present invention, the SMCC may be used as the only filler or in combination with other fillers such as natural ground calcium carbonate (GCC) and/or precipitated calcium carbonate (PCC), or any one of the ones mentioned above.

The SMCC may account for 5 to 100 wt %, preferably 10 to 40 wt %, more preferably 20 to 30, e.g. 25 wt % of the total filler amount.

In a preferred embodiment, other reinforcing fillers, such as fumed silica, are replaced by SMCC. In this respect, it is preferred that the other reinforcing filler is replaced at a level of 10 to 100 wt %, more preferably at a level of 50 to 100 wt %, especially at a level of 70 to 100 wt %, most preferably at a level of 90 to 100 wt %, ideally at a level of 100 wt %.

Generally, the SMCC may be present in the adhesives, sealants, and/or caulks in an amount of from 2 to 70 wt %, preferably of from 10 to 60 wt %, more preferably of from 20 to 50 wt %, most preferably of from 30 to 40 wt %.

A further aspect of the present invention is a method of producing adhesives, sealants and/or caulks comprising the steps of a) providing an adhesive, sealant, and/or caulk formulation as defined above,
b) providing SMCC as defined above,
c) combining the SMCC with the adhesive, sealant and/or caulk formulation.

The SMMC may be provided in dry form, or in the form of a suspension having a solids content as mentioned above.

The combination of SMCC may take place by means of conventional mixing methods.

The rheological and physical attributes such as slump, elasticity and adhesion properties of the adhesives, sealants and/or caulks comprising SMCC are equal to or better than those of formulas comprising fumed silica, and/or other reinforcing fillers.

In addition, the use of SMCC provides for a lower binder demand of the resulting adhesive, sealant and/or caulk formulations. Furthermore, the adhesive, sealant and/or caulk formula densities may be reduced. Likewise, the overall density of the formulation may allow the manufacturer to package an equal volume per cartridge, while increasing the number of cartridges per batch, thus resulting in a higher yield per formulation versus the non SMCC containing formulas.

Thus, it is finally a further aspect of the present invention to provide adhesives, sealants, and/or caulks obtained by the above method of producing the same comprising SMCC.

The invention claimed is:

1. An adhesive, sealant or caulk comprising surface modified calcium carbonate as a filler, wherein the surface modified calcium carbonate is a mineral pigment product formed in situ by the double and/or multiple reaction between a calcium carbonate and the reaction product or products of the carbonate with gaseous $CO_2$ formed in situ and/or coming from an external supply, and the reaction product or products of the carbonate with one or more moderately strong to strong $H_3O^+$ ion donors, and at least one aluminium silicate and/or at least one synthetic silica and/or at least one calcium silicate and/or at least one silicate of a monovalent salt and/or at least one aluminium hydroxide and/or at least one sodium and/or potassium aluminate.

2. The adhesive, sealant or caulk according to claim 1, wherein the silicate of a monovalent salt is sodium silicate, potassium silicate, or lithium silicate.

3. The adhesive, sealant or caulk according to claim 1, wherein the calcium carbonate is natural ground calcium carbonate, precipitated calcium carbonate, or a mixture of natural ground calcium carbonate with one or more of talc, kaolin, titanium dioxide, magnesium oxide or any mineral that is inert to treatment with a moderately strong to strong $H_3O^+$ ion donors.

4. The adhesive, sealant or caulk according to claim 1, wherein the calcium carbonate comprises marble, calcite, chalk, dolomite or any mixture thereof 5. The adhesive, sealant or caulk according to claim 1, wherein the strong $H_3O^+$ ion donors are strong acids or any mixture thereof generating $H_3O^+$ ions, acids having a $pK_a$ of less than or equal to zero at 22° C., sulphuric acid, hydrochloric acid or any mixture thereof, and the moderately strong $H_3O^+$ ion donors are acids having a $pK_a$ of from 0 to 2.5 at 22° C., $H_2SO_3$, $HSO_4^-$, $H_3PO_4$, oxalic acid or any mixture thereof, acids forming bivalent cation salts, or acids forming calcium salts.

6. The adhesive, sealant or caulk according to claim 1, wherein the surface modified calcium carbonate has a BET specific surface area of 25 m²/g to 200 m²/g measured according to ISO 9277.

7. The adhesive, sealant or caulk according to claim 1, wherein the surface modified calcium carbonate has a BET specific surface area of 30 m²/g to 80 m²/g measured according to ISO 9277.

8. The adhesive, sealant or caulk according to claim 1, wherein the surface modified calcium carbonate has a BET specific surface area of 35 m²/g to 60 m²/g measured according to ISO 9277.

9. The adhesive, sealant or caulk according to claim 1, wherein the surface modified calcium carbonate has a volume median particle diameter $d_{50}$ of from 0.1 to 50 μm.

10. The adhesive, sealant or caulk according to claim 1, wherein the surface modified calcium carbonate has a volume median particle diameter $d_{50}$ of from 1 to 10 μm.

11. The adhesive, sealant or caulk according to claim 1, wherein the surface modified calcium carbonate has a volume median particle diameter $d_{50}$ of from 1.5 to 5 μm.

12. The adhesive, sealant or caulk according to claim 1, wherein the surface modified calcium carbonate is in a dry form or in a form of an aqueous suspension having a pH greater than 7.5 measured at 20° C.

13. The adhesive, sealant or caulk according to claim 1, wherein the surface modified calcium carbonate comprises a cationic, an anionic, and/or a weakly anionic electrolyte.

14. The adhesive, sealant or caulk according to claim 1, which comprises one or more of acrylic, polyurethane, polysulfide, silyl-terminated polyether or polyurethane, silicone, or silicone modified resins or binders.

15. The adhesive, sealant or caulk according to claim 1, which is water-based, solvent-based or does not contain any solvent.

16. The adhesive, sealant or caulk according to claim 1, which comprises one or more of binders, rubber, adhesion promoters, pigments and fillers.

17. The adhesive, sealant or caulk according to claim 1, wherein the surface modified calcium carbonate is the only filler or is used in combination with one or more additional fillers.

18. The adhesive, sealant or caulk according to claim 1, wherein the surface modified calcium carbonate accounts for 5 to 100 wt % of the total filler amount.

19. The adhesive, sealant or caulk according to claim 1, wherein the surface modified calcium carbonate accounts for 10 to 40 wt % of the total filler amount.

20. The adhesive, sealant or caulk according to claim 1, wherein the surface modified calcium carbonate accounts for 20 to 30 wt % of the total filler amount.

21. A method of producing an adhesives, sealant or caulk comprising the steps of:
a) providing an adhesive, sealant or caulk formulation,
b) providing surface modified calcium carbonate, wherein the surface modified calcium carbonate is a mineral pigment product formed in situ by the double and/or multiple reaction between a calcium carbonate and the reaction product or products of the carbonate with gaseous $CO_2$ formed in situ and/or coming from an external supply, and the reaction product or products of the carbonate with one or more moderately strong to strong $H_3O^+$ ion donors, and at least one aluminium silicate and/or at least one synthetic silica and/or at least one calcium silicate and/or at least one silicate of a monovalent salt and/or at least one aluminium hydroxide and/or at least one sodium and/or potassium aluminate, and
c) combining the surface modified calcium carbonate with the adhesive, sealant or caulk formulation.

22. An adhesive, sealant or caulk obtained by the method of claim 21.

* * * * *